United States Patent
Dowlatkhah et al.

(10) Patent No.: US 10,958,584 B2
(45) Date of Patent: *Mar. 23, 2021

(54) METHOD AND SYSTEM FOR DYNAMICALLY DISTRIBUTING AND CONTROLLING A VIRTUAL GATEWAY

(71) Applicant: AT&T Intellectual Property I, L.P., Atlanta, GA (US)

(72) Inventors: Sangar Dowlatkhah, Alpharetta, GA (US); Venson Shaw, Kirkland, WA (US); Zhi Cui, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,981

(22) Filed: Oct. 1, 2019

(65) Prior Publication Data
US 2020/0036641 A1 Jan. 30, 2020

Related U.S. Application Data (63) Continuation of application No. 16/106,498, filed on Aug. 21, 2018, now Pat. No. 10,469,392, which is a
(Continued)

(51) Int. Cl.
*H04L 12/28* (2006.01)
*H04L 12/851* (2013.01)
(Continued)

(52) U.S. Cl.
CPC ...... *H04L 47/2425* (2013.01); *H04L 12/2834* (2013.01); *H04L 12/4641* (2013.01); *H04L 45/302* (2013.01)

(58) Field of Classification Search
CPC ............ H04L 47/2425; H04L 47/2433; H04L 47/2441; H04L 47/2475; H04L 47/2483; H04L 47/2491; H04L 12/4641
See application file for complete search history.

(56) References Cited

U.S. PATENT DOCUMENTS

| 6,389,031 B1 * | 5/2002 | Chao | H04L 47/10 370/412 |
| 6,650,641 B1 | 11/2003 | Albert et al. | |

(Continued)

FOREIGN PATENT DOCUMENTS

| CN | 103067268 A | 4/2013 |
| CN | 103701628 A | 4/2014 |
| EP | 2983333 | 2/2016 |

OTHER PUBLICATIONS

Dillon, Marion et al., "Network Functions Virtualization in Home Networks", Computer, www.computer.org/computer Nov. 2014, vol. 47, No. 1, Nov. 2014, 6 pps.

(Continued)

*Primary Examiner* — Kevin D Mew
(74) *Attorney, Agent, or Firm* — Guntin & Gust, PLC; Robert Gingher (57) ABSTRACT

Aspects of the subject disclosure may include, for example, detecting network traffic of a traffic flow at a traffic controller of a first portion of a software-defined network, wherein the detected network traffic is based on a service of a number of services. A source of the detected network traffic is identified based on the detected traffic, wherein the traffic flow is between a subscriber device and a service platform. The service is identified based on the detected network traffic, and a service requirement is determined based on the identifying of the service. A virtual network function of a plurality of virtual network functions is selected based on the source of the network traffic and the service requirement, and a traffic flow is facilitated between the subscriber device and the service platform by way of the virtual network function. Other embodiments are disclosed.

20 Claims, 6 Drawing Sheets

Related U.S. Application Data continuation of application No. 15/265,394, filed on Sep. 14, 2016, now Pat. No. 10,097,472.

(51) Int. Cl.
  *H04L 12/46* (2006.01)
  *H04L 12/725* (2013.01)

(56) References Cited

U.S. PATENT DOCUMENTS

| | | | |
|---|---|---|---|
| 7,376,125 B1* | 5/2008 | Hussain | H04L 45/00 370/352 |
| 8,782,637 B2 | 7/2014 | Khalid | |
| 8,813,175 B2 | 8/2014 | Chowdhry | |
| 8,824,487 B1 | 9/2014 | Ray | |
| 9,173,117 B2 | 10/2015 | Haddad et al. | |
| 9,191,415 B2 | 11/2015 | Diab et al. | |
| 9,235,856 B2 | 1/2016 | Parker | |
| 9,274,825 B2 | 3/2016 | Sridharan et al. | |
| 9,674,731 B2 | 6/2017 | Lavine et al. | |
| 9,749,898 B2 | 8/2017 | Lavine et al. | |
| 9,749,899 B2 | 8/2017 | Lavine et al. | |
| 9,967,200 B2* | 5/2018 | Hussain | H04L 47/6215 |
| 2001/0034758 A1 | 10/2001 | Kikinis et al. | |
| 2010/0054129 A1* | 3/2010 | Kuik | H04L 49/70 370/235 |
| 2011/0022812 A1 | 1/2011 | van der Linden et al. | |
| 2011/0314145 A1* | 12/2011 | Raleigh | H04L 63/08 709/224 |
| 2012/0092992 A1 | 4/2012 | Pappas et al. | |
| 2012/0166538 A1 | 6/2012 | Son et al. | |
| 2012/0269053 A1 | 10/2012 | Yu et al. | |
| 2012/0290643 A1 | 11/2012 | Fok Ah Chuen et al. | |
| 2013/0159490 A1 | 6/2013 | Huh et al. | |
| 2013/0329746 A1 | 12/2013 | Palacios Valverde et al. | |
| 2014/0003340 A1 | 1/2014 | Park et al. | |
| 2014/0172947 A1 | 6/2014 | Ghai et al. | |
| 2014/0226642 A1 | 8/2014 | Haddad et al. | |
| 2014/0269709 A1 | 9/2014 | Benny et al. | |
| 2014/0334485 A1 | 11/2014 | Sengupta et al. | |
| 2015/0124622 A1 | 5/2015 | Kovvali et al. | |
| 2015/0128215 A1 | 5/2015 | Son et al. | |
| 2015/0163151 A1* | 6/2015 | Li | H04L 41/044 370/236 |
| 2015/0281098 A1* | 10/2015 | Pettit | H04L 49/9042 370/235 |
| 2015/0281125 A1 | 10/2015 | Koponen et al. | |
| 2015/0349975 A1 | 12/2015 | Hu et al. | |
| 2015/0372973 A1 | 12/2015 | Lopez Da Silva et al. | |
| 2015/0381596 A1 | 12/2015 | Johnson et al. | |
| 2016/0006696 A1 | 1/2016 | Donley | |
| 2016/0011896 A1 | 1/2016 | Khalid | |
| 2016/0212012 A1* | 7/2016 | Young | G06F 9/45558 |
| 2017/0026417 A1 | 1/2017 | Ermagan et al. | |
| 2018/0024537 A1* | 1/2018 | Chauvet | G06F 9/455 718/104 |
| 2018/0077067 A1 | 3/2018 | Dowlatkhah et al. | |
| 2018/0337862 A1 | 11/2018 | Sharma et al. | |
| 2018/0359190 A1 | 12/2018 | Dowlatkhah et al. | |
| 2020/0092193 A1* | 3/2020 | Tillotson | H04L 45/02 |

OTHER PUBLICATIONS

Hakiri, Akram et al., "Towards a Publish/Subscribe-based Open Policy Framework for Proactive Overlay Software Defined Networking", ISIS (2015): 15-115, 2015, 9 pps.

Kim, Hyojoon et al., "Improving Network Management with Software Defined Networking", Communications Magazine, IEEE 51.2 (2013): 114-119, 2013.

Modig, Dennis, "Assessing Performance and Security in Virtualized Home Residential Gateways", Master Degree Project in Computer Science, Spring VT2014, University of Skövde, Sep. 11, 2014, 68 pps.

\* cited by examiner

100
FIG. 1

TMG: Traffic management gateway
DSM: Distributed Service manager
SSPC: Subscriber Service policy Controller Repository
HBSH: Homebased service Handler

FIG. 7

METHOD AND SYSTEM FOR DYNAMICALLY DISTRIBUTING AND CONTROLLING A VIRTUAL GATEWAY

CROSS-REFERENCE TO RELATED APPLICATIONS

This application is a continuation of U.S. application Ser. No. 16/106,498, filed Aug. 21, 2018, which is a continuation of U.S. patent application Ser. No. 15/265,394 filed on Sep. 14, 2016, now U.S. Pat. No. 10,097,472. The contents of the foregoing are hereby incorporated by reference into this application as if set for herein in full.

FIELD OF THE DISCLOSURE

The subject disclosure relates to a method and system for dynamically distributing and controlling a virtual gateway.

BACKGROUND

According to recent trends, individual consumers and families are adopting greater numbers and varieties of network accessible devices and applications that can be used in and around the home. The devices include wired and wireless devices that access network resources according to one or more access technologies. Some examples of access technologies include, cable, fiber, digital subscriber lines (DSL), wireless local area network (LAN), e.g., WiFi, Bluetooth, and mobile cellular, e.g., 3G, 4G.

The devices and applications can be used to access one or more network accessible services, such as broadcast media, voice, messaging, Internet services, and the like. A common residential configuration provides a home or residential gateway device that connects a residential LAN with another network outside of the home, such as an access network and/or a wide area network (WAN), e.g., the Internet. Access to a WAN can be provided via the access network, which can be provided by a carrier service provider, employing transport technologies, such as cable, fiber or DSL.

The term home or residential gateway was originally used to distinguish inexpensive networking devices designated for use in home environments from similar devices used in corporate LAN environments, which traditionally offered a greater array of capabilities. The residential gateway device may include one or more of a cable modem, a DSL modem, a wired router and a wireless access point, a wireless router, a network switch, a Voice over Internet Protocol (VoIP) analog telephone adapter, and the like. Wireless access point and/or router can implement one or more of the IEEE 802.11 wireless protocols.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for dynamically distributing and controlling functionality of a residential gateway. In particular, at least some functionality of the residential gateway is provided and otherwise controllable by a carrier network and/or service provider. Other embodiments are described in the subject disclosure.

One or more aspects of the subject disclosure include a device including a processing system having a processor and a memory that stores executable instructions. The executable instructions, when executed by the processing system, facilitate performance of operations, including receiving a request for a network traffic flow at a first traffic flow controller of a first portion of a software-defined network, wherein the request for the network traffic flow is based on a service of a number of services. A source of the network traffic flow is identified based on the received traffic, wherein the network traffic flow is between an end user device and a service platform of a number of service platforms. The service of the number of services is identified based on the request for the network traffic flow. A service requirement is determined based on the identifying of the service of the number of services. A virtual network function of a number of virtual network functions is selected based on the source of the network traffic flow and the service requirement. A network traffic flow is configured between the end user device and the service platform by way of the virtual network function of the number of virtual network functions.

One or more aspects of the subject disclosure include a process that includes intercepting, by a processing system including a processor, a request for a network traffic flow at a first traffic flow controller of a first portion of a software-defined network. The intercepted request for the network traffic flow is based on a service of a number of services. A source of the requested network traffic flow is identified based on the requested network traffic flow, wherein the network traffic flow is between an end user device and a service platform of a number of service platforms. The service of the number of services is identified based on the requested network traffic flow. A service requirement is determined based on the identifying of the service of the number of services. A virtual network function of a number of virtual network functions is selected based on the source of the network traffic flow and the service requirement. The requested network traffic flow is facilitated between the end user device and the service platform by way of the virtual network function of the number of virtual network functions.

One or more aspects of the subject disclosure include a machine-readable storage medium, including executable instructions that, when executed by a processing system including a processor, facilitate performance of operations. The operations include: detecting a request for a network traffic flow at a first traffic controller of a first portion of a software-defined network, to obtain requested network traffic flow, wherein the requested network traffic flow is based on a service of a number of services. A source of the requested network traffic flow is determined based on the requested network traffic flow, wherein the network traffic flow is between a subscriber device and a service platform of a number of service platforms. The service of the number of services is identified based on the requested network traffic flow. A service requirement is determined based on the identifying of the service of the number of services. A virtual network function of a number of virtual network functions is selected based on the source of the network traffic flow and the service requirement. The requested network traffic flow is facilitated between the subscriber device and the service platform by way of the virtual network function of the number of virtual network functions.

A residential gateway device serving a home is generally configured with an ability to handle each type of network traffic anticipated to and/or from the home. Although many residential gateway devices are sufficiently sophisticated to support the different network operator and user services, currently available models include relatively low cost, failure prone devices, that often requiring frequent intervention by largely non-technical users. Residential gateways must be up-to-date to support new protocols, otherwise, each different m2m service would require a separate gateway in the home. Moreover, a growing trend of machine-to-machine (m2m) technology can require a virtually constant connection with a gateway or server, e.g., combined with proprietary communication protocols.

Beneficially, the various techniques disclosed herein, such as software defined networking (SDN) and/or network function virtualization (NFV), offer solutions to the problem of increasing complexity of the residential gateway, by moving at least some of the complexity out of the home. For example, an SDN enabled residential gateway allows at least some of the complex functionality to be removed from the home and relocated to one or more other locations outside of the home, e.g., within a carrier network, a service provider network, or more generally, in "the cloud." The complex functionality removed from the home can be allocated to or otherwise distributed in one or more network devices. Example devices include, without limitation, sophisticated servers, virtual gateways, more generally, virtual machines, and the like. Configuring a virtual gateway as a service allows the gateway functionality to be adaptable to new technologies and/or protocols. Moreover, the service provider benefits from direct access, e.g., for management and customer service improvement, alleviating home subscribers' responsibility for such activities.

As used herein, "the cloud," can include a carrier and/or service provider network infrastructure, such as a carrier and/or service provider access network. Accordingly, the cloud can include devices and/or services owned, operated, or otherwise allocated to the carrier and/or service provider's access network. In at least some embodiments, the cloud can include virtually any device and/or service accessible by a network, including LANs, WANs, enterprise networks, the world-wide web (WWW) and/or the Internet in general.

Figure 1:
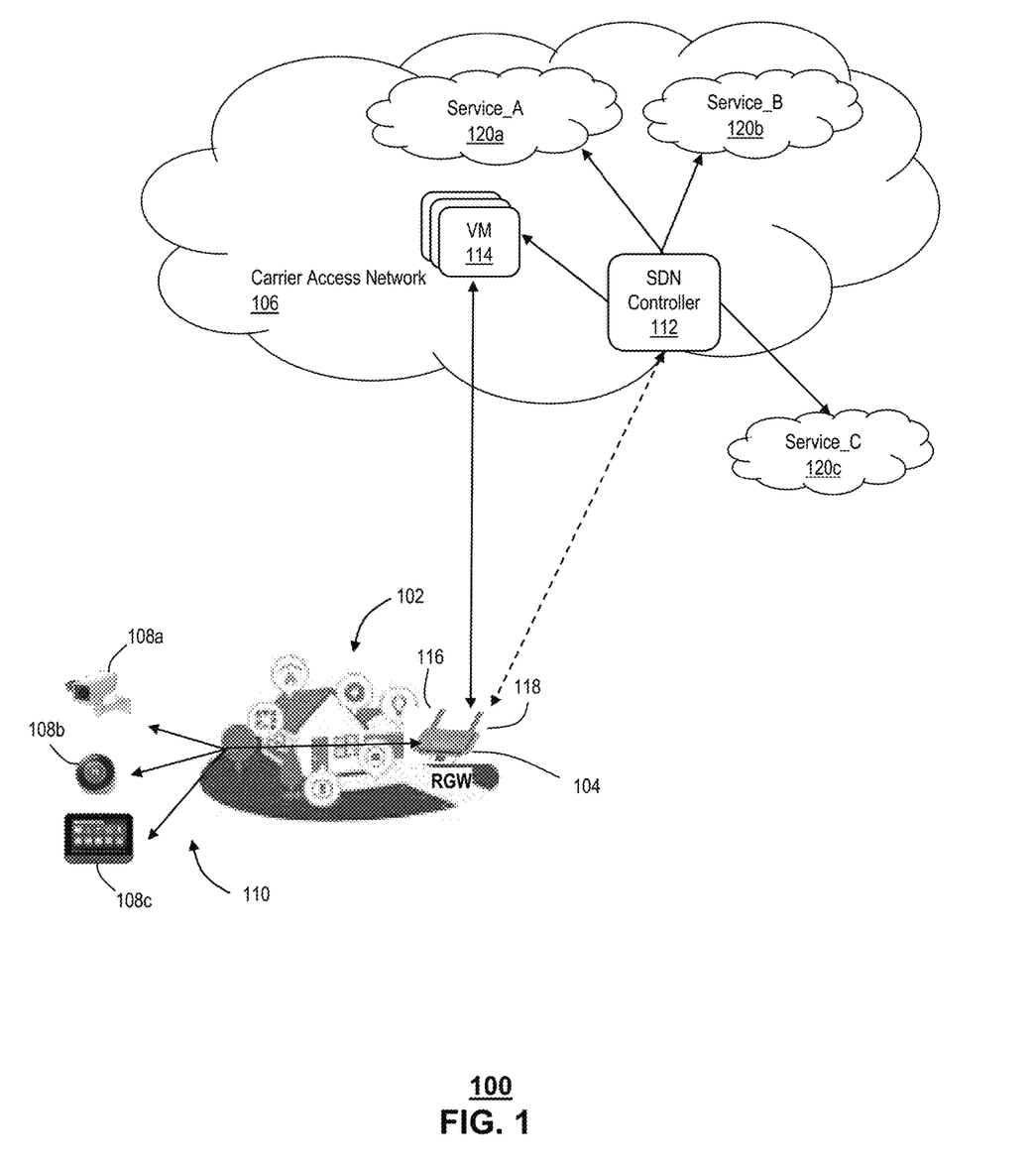
FIG. 1 depicts an illustrative embodiment of a communication system that applies network function virtualization to a residential gateway.

FIG. 1 depicts an illustrative embodiment of a communication system 100 that applies network function virtualization to a residential gateway. A network-enabled residence 102 includes a network device 104, such as a home or residential gateway, that facilitates an exchange of network traffic between remote entities and one or more devices at, near or otherwise associated with the home. Such remote entities can be accessed through a carrier access network 106, a WAN, and/or one or more other networks and/or service platforms.

Network accessible devices at, near or otherwise associated with the home can include, without limitation, one or more of: a home security system 108a, e.g., including one or more of cameras, motion sensors, entry detectors, smoke and/or $CO_2$ detectors; smart home sensors and/or controllers 108b, e.g., smart thermostats, lighting controls, door entry controls; and user devices 108c, e.g., computers, tablet devices, VoIP telephones, mobile phones, remote controllers, game consoles, media processors, smart televisions, personal digital assistants, which are collectively referred to as network enabled or network accessible devices 108. It is understood that network accessible devices 108a, 108b, 108c can include virtually any network accessible device, such as a home appliance, a utility appliance, such as a utility meter, a vehicle, and/the Internet and/or or any other device that participates in m2m communications, e.g., as in an Internet of Things (IoT) scenario.

The residential gateway 104 facilitates connection of the LAN 110 to the WAN. The WAN can be a larger computer network (such as a municipal WAN that provides connectivity to residences within the municipality), or the Internet. WAN connectivity can be provided through an access network 106 including one or more of a DSL, a cable modem, a broadband mobile phone network, or another connection.

The illustrative embodiment further includes an SDN controller 112 in communication with one or more virtual machines 114. A physical portion of the residential gateway 104 remaining in the home communicates with the SDN controller 112 and one or more of the virtual machines 114. One or more of the virtual machines 114, e.g., virtual home gateways 114 can be associated with the residential gateway 104 and configured to implement at least a portion of the residential gateway functionality. Accordingly, network traffic between devices 108 connected to the home LAN 110 and other devices and/or systems outside of the home can traverse the residential gateway 104 and the one or more virtual home gateways 114 associated with the residential gateway.

Configuration and/or monitoring of the gateway 104, the virtual home gateways 114 and/or the traffic flow can be facilitated by the SDN controller 112. In at least some embodiments, user traffic traverses the SDN controller 112 in any network exchanges between the residential LAN 110 and one or more service platforms 120a, 120b, 120c, generally 120.

The SDN controller 112 can implement a communication protocol, e.g., an SDN flow control protocol that enables network controllers, such as the SDN controller 112, to determine a path of network packets across network of switches. By way of non-limiting example, one such SDN flow control protocol includes OpenFlow communications protocol of the Open Networking Foundation.

The SDN flow control protocol can facilitate operation of residential gateways 104 as switches, e.g., "Open-Flow" switches. This configuration allows a carrier to control at least a portion of traffic flows associated with the home 102, through the entire network.

Utilizing the SDN controller 112 in combination of one or more virtual home gateways 114 as virtual network function(s) (VNF) can solve the aforementioned limitations of traditional residential gateways. To at least some extent, this can be accomplished by moving one or more complex functions of the residential gateway 104 to the cloud 106, e.g., configuring a virtual home gateway 114 in the cloud 106 and employing the SDN controller 112 to control intelligence of the residential gateway via the virtual home gateway 114.

The home equipment can be characterized as a bridged residential gateway 104 that communicates with the virtual home gateway 114 located on the WAN 106, and which has at least some subset of home gateway functionality. The virtual home gateway 114 can be characterized as a logical service with a subset of home gateway functionality, located at one or more nodes of a carrier network's access network and/or cloud solution.

The controllers 112 can be distinct from the switches 104, providing for separation of a control from a forwarding, user or data plane that allows for more sophisticated traffic management than would otherwise be feasible using access control lists and routing protocols. For example, the SDN controller 112 flags or otherwise identifies network traffic from a home network 110 to direct the network traffic to a corresponding virtual home gateway 114. The bridged residential gateway 104 need not be aware of a location of the virtual home gateway, provided that it is located somewhere on an SDN accessible by the SDN controller 112.

An OpenFlow controller is an application that manages flow control in an SDN environment. Most current SDN controllers 112 are based on an OpenFlow protocol. An SDN process can be employed utilizing the OpenFlow protocol in order to transform residential gateways 104 into SDN-enabled, e.g., OpenFlow, switches. This allows carrier to control flows through the entire network. Also, the OpenFlow protocol allows switches from different vendors—often each with their own proprietary interfaces and scripting languages—to be managed remotely using a single, open protocol.

An SDN protocol, such as OpenFlow, allows for remote administration of a layer 3 switch's packet forwarding tables, by adding, modifying and/or removing packet matching rules and/or actions. In this manner, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets that are unmatched by the switch can be forwarded to the controller. The SDN controller 112 can then decide to modify existing flow table rules on one or more switches and/or to deploy new rules, to prevent a structural flow of traffic between a switch and a controller. The SDN controller 112 could even decide to forward the traffic itself, provided that it has told the switch 104 to forward entire packets instead of just their header.

The networking solution of the network-enabled residence 102 connects devices on a LAN interfaces 116 and routes traffic to a WAN interface 118 and ultimately provider's network and the WAN 108. Bridged residential gateways 104 are devices in the home, that can communicate with a virtual home gateway 114 located on the WAN 108, and which has some subset of residential gateway functionality. The virtual home gateway 114 is a logical service with a subset of residential gateway functionality, located at one or more nodes in the carrier service provider's access network 106 or cloud solution.

The SDN controller 112 flags or otherwise identifies traffic from a home network 110 and facilitates direction of the flagged traffic to its respective virtual home gateway 114, located somewhere in the service provider's access network or, more generally, in the cloud. The bridged residential gateway 104 need not be aware of the location of the virtual home gateway 114, as long as the virtual home gateway 114 is located somewhere on the SDN, associated with or otherwise under control of the SDN controller 112.

The illustrative example includes one or more service platforms 120a, 120b provided within or otherwise accessible by the carrier service provider's access network 106. Alternatively or in addition, one or more service platforms 120c can be located external to the access network 106, e.g., within an enterprise network, the Internet, or some other LAN and/or WAN. The service platforms can include, without limitation, video service platforms, VoIP service platforms, home security service platforms, messaging service platforms, live content service platforms, on-demand service platforms, and the like.

When an array of services is utilized by a consumer, certain applications, such as health related services, may require low latency and high security, which can be accommodated by rendering service close to the subscriber and the equipment related to that service. Other services, such as gaming and recreational applications that may not demand restrictive resource requirements, e.g., latency, or security measures. These other services are not adversely impacted by rendering services remote from the subscriber and the equipment related to such other services.

Figure 2:
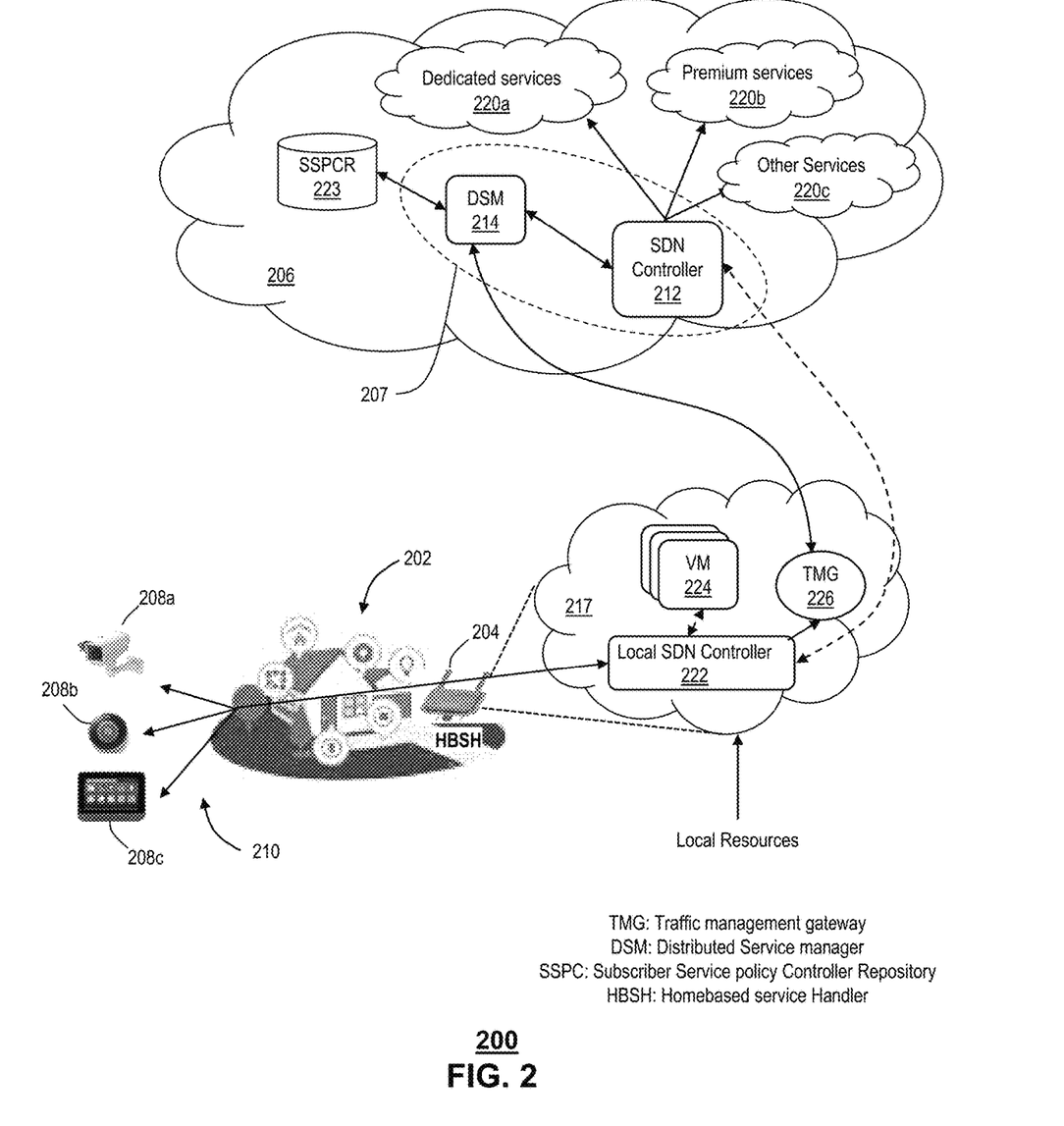
FIG. 2 depicts an illustrative embodiment of another communication system that applies network function virtualization to a residential gateway.

FIG. 2 depicts an illustrative embodiment of another communication system 200 that applies network function virtualization that supports residential or home-based service delivery. In particular, the system 200 provides a solution that allows for an SDN having a restricted portion, e.g., a local portion that can be provided at or near a home, and an unrestricted portion, e.g., a remote portion that can be provided within the cloud.

A network-enabled residence 202 includes a network device, such as a home or residential gateway and/or home-based service handler 204, that facilitates an exchange of network traffic between remote entities and one or more network-accessible devices 208, e.g., end-user or subscriber devices 208 at, near or otherwise associated with the home 202. Such remote entities can be accessed through a carrier access network, a WAN, and/or one or more other networks and/or service platforms.

In the illustrative embodiment, the homebased service handler 204 facilitates connection of a home or residential LAN 210 to an access network and/or a WAN 206. The WAN 206 can be a larger computer (such as a municipal WAN that provides connectivity to residences within the municipality), or the Internet and/or telecommunications network, such as a carrier and or service provider network. WAN connectivity can be provided through an access network including one or more of a DSL, a cable modem, a broadband mobile phone network, or another connection.

The illustrative embodiment includes an SDN having restricted resources, e.g., a local portion 217 that can be provided at or near a home 202, and unrestricted resources, e.g., a remote portion 207 that can be provided within the cloud 206. The local portion 217 and the remote portion 207 collectively provide comprehensive homebased service handling and/or residential gateway functionality. In at least some embodiments, a first portion of the functionality is provided by the local portion 217, whereas, a second portion of the functionality is provided by the remote or cloud portion 207. Accordingly, it is understood that in at least some embodiments, a portion of network traffic can be handled by the local portion 217, without requiring participation of the remote portion 207, at least with respect to user plan or data traffic.

By way of illustrative example, the local portion 217 can include a local SDN controller 222, one or more virtual machines 224 and a traffic management gateway 226. The Local SDN controller 222 is configured to control or otherwise manage configuration and/or operation of the local resources 217 together with the SDN 212 controller, sometimes referred to a as a cloud or main SDN controller.

The virtual machines 224 are configured to render networking services to locally enabled applications, e.g., at the residence 202 based on one or more end-user and/or subscriber devices 208. The traffic management gateway 226 can be configured to redirect cloud-based services to a distributed service manager 214. The distributed service manager 214 can be in communication between the traffic management gateway 226 of the local resources 217 and the SDN controller 212 in the cloud. It is understood that in at least some embodiments, the distributed service manager 214 is in further communication with a subscriber service policy controller repository.

The local SDN controller 222 is in communication with one or more virtual network functions 224. In some embodiments, at least a portion of the home-base service handler 204 remains within the home 202 communicates with the SDN controller 212 and one or more of the virtual network functions 224. One or more of the virtual network functions 224, e.g., virtual network functions 224 can be associated with one or more of the residential gateway and home-base service handler 204 and configured to implement at least a portion of the residential gateway functionality and/or home-base service handler functionality. Accordingly, network traffic between devices 208 connected to the home LAN 210 and other devices and/or systems outside of the home can traverse the residential gateway and/or home-based service handler 204 and the one or more of the associated virtual network functions 224.

Configuration and/or monitoring of the gateway 204, the virtual home gateways 214 and/or the traffic flow can be facilitated by the SDN controller 212. In at least some embodiments, user traffic traverses the SDN controller 212 in any network exchanges between the residential LAN 210 and one or more service platforms, such as dedicated services 220a, premium services 220b, and/or other services 220c, generally 220.

On the cloud side when a request is being sent to the distributed service manager 214 through the SDN controller 212, e.g., to delegate a service request, the distributed service manager 214 accesses or otherwise obtains a service profile from the subscriber service policy controller repository 223 and depending on a level of service agreement, directs the service to a dedicated and/or premium slice of the network, as per the polices for that specific service. In some embodiments, one or more of the dedicated services 220a, the premium services 220b and the other services 220c represent respected "slices" of a carrier and/or service provider network. It is understood that network traffic can be associated with, or otherwise directed to a particular slice of the various network slices 220a, 220b, 220c. A particular slice can be determined by one or more of the distributed service manager 2114, the traffic management gateway 226, the SDN controller 212, 222, and contents of the subscriber service policy controller repository 223.

It is understood that the traffic management gateway 226 can be configured to facilitate a network flow through one or more of the virtual machines 224 based on policies, rules and/or preferences. Facilitating network flows through such local resources can offer one or more advantages that may not be assured otherwise. For example, if a particular service requires a relatively low latency, and/or a relatively high level of security, the traffic management gateway 226 can facilitate network routing through the virtual network function 224, without necessarily including one or more of the SDN controller 212, the distributed service manager 214, and more generally, the cloud resources 206. In some embodiments, the traffic management gateway implements a network flow configuration based on one or more of current network conditions, historical network flows, user preferences, service provider preferences, carrier preferences, service platform preferences, and the like. It is further understood that such preferences can be arranged or otherwise implemented according to a logic. For example, the logic can include a hierarchy of priorities, in which one source exerts priority over another. Such logic can apply rules, policies or preferences in combinations, in which the application follows a sequencing ordering. Such application of logic, rules and/or preferences can include error checking to identify inconsistencies and take action, provide notice or both based on any error checking results.

Figure 3:
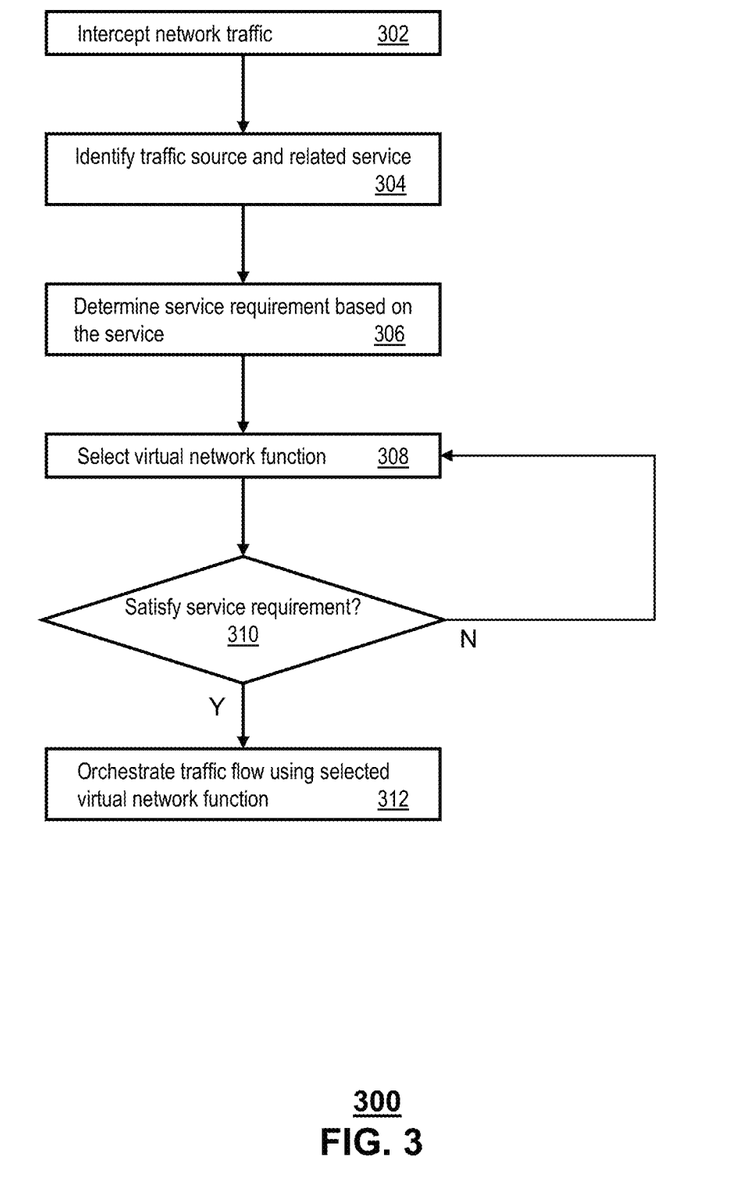
FIG. 3 depicts an illustrative embodiment of a process used in portions of the system described in FIGS. 1-2.

FIG. 3 depicts an illustrative embodiment of a process 300 used in portions of the system described in FIGS. 1-2. The process includes intercepting a network traffic flow at 302. The network traffic flow is between a subscriber, or end-user device and a service platform. The interception of the traffic flow can be accomplished at a first traffic flow controller of a first portion of a software-defined network. It is generally understood that the intercepted network traffic is based on one or more services of a number of different services as may be available based on one or more of the service provider, the user or subscriber, subscriptions, and the like.

In at least some embodiments, a request for a network traffic flow is received, intercepted or otherwise detected at 302. Interception can occur at one or more of the local SDN controller 222 (FIG. 2), the traffic management gateway 226, the SDN controller 212, a virtual machine 224 instantiated by one or more of the local SDN controller 222 and/or the SDN controller 212, and/or the distributed service manager 214. The request can be initiated by a user, e.g., a subscriber, and/or an application or app. For example, a subscriber requests a service from a service provider, such as a streaming media service provider, e.g., video on demand. In at least some embodiments, the service can be requested by way of an application. For example, a subscriber launches a streaming media app to identify, select, download and/or otherwise access streaming media content. The request, if implemented successfully, results in a delivery of streaming media to equipment of the subscriber. The traffic flow can include one or more of the request to access the service itself, an interactive communication session between the subscriber and equipment of the service provider, e.g., reviewing electronic programming guides, viewing previews, and selecting media content, and/or ultimate delivery of any selected content.

A service requirement is determined at 306, based on the identifying at 304 of the service of the plurality of services. For example, the service requirement can be based on one or more of the service provider, the service(s), the user or subscriber, subscriptions, network conditions, historical information, such as historical performance indicators, past selections and the like.

A virtual network function of a number of virtual network functions is identified at 308. An evaluation is performed at 310 to determine whether application of the virtual network function satisfies the service requirement. To the extent that the service requirement is not satisfied, another virtual network function is identified at 308 and the evaluation repeated at 210 for the other virtual network function. The process, i.e., steps 308 and 310 can be repeated until either a particular virtual network function is identified, or it is determined that none of the available virtual network functions satisfy the requirement.

In some embodiments, if no virtual network function is identified, an error message can be provided. The error message can be directed to one or more of a source of the network traffic, a destination of the network traffic, a subscriber associated with the network traffic, a carrier and/or service provider, and the like.

In some embodiments, if no virtual network function is available, a request can be generated to identify, request or otherwise provision one or more virtual network functions. To the extent such a request is made, the process, e.g., at least steps 308-310 can be repeated upon a determination that further virtual network functions are available.

To the extent that it is determined that the virtual network function satisfies the service requirement, a traffic flow is configured at 312 between the end user device and the service platform by way of the virtual network function of the plurality of virtual network functions.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
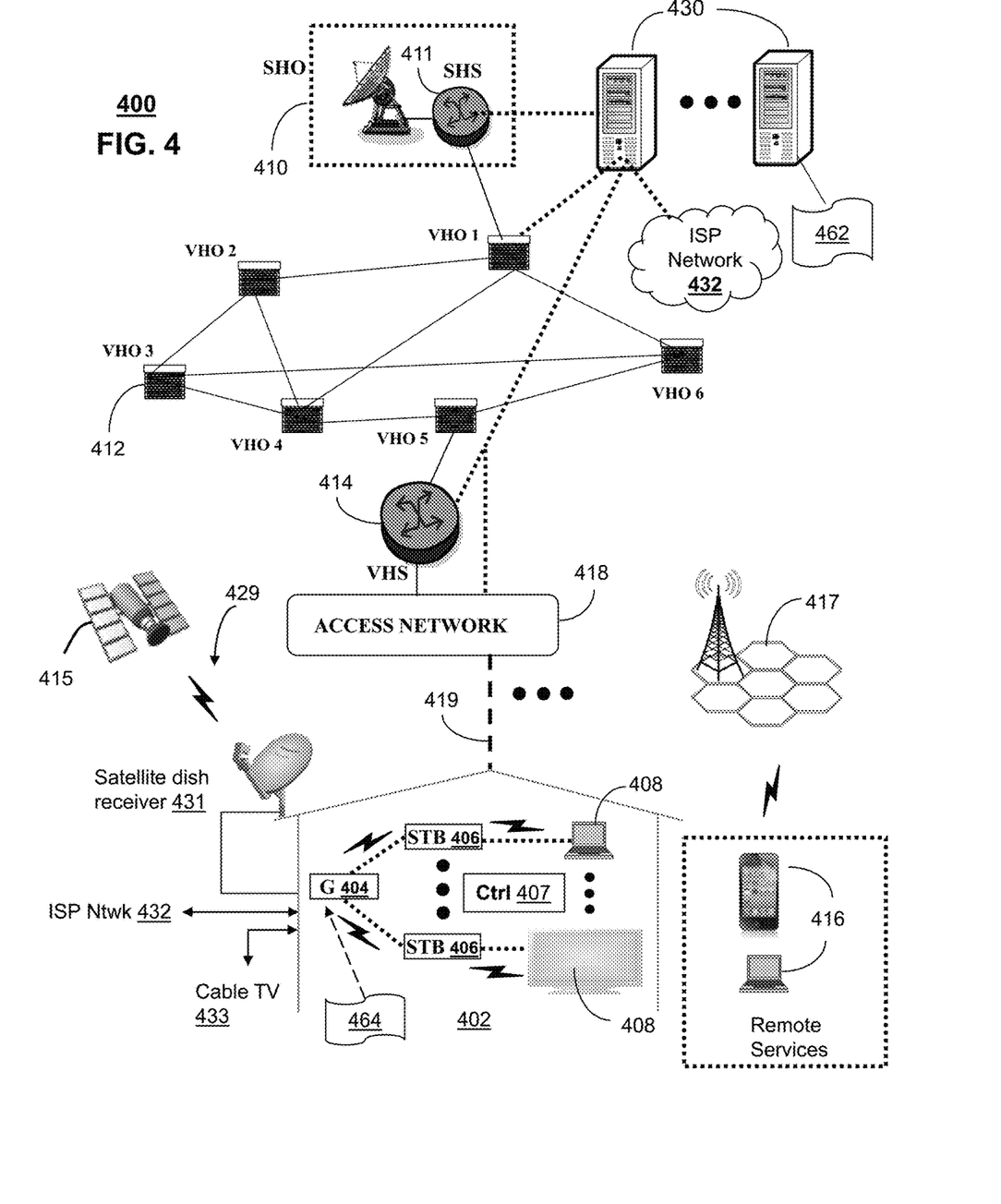
FIG. 4 depicts an illustrative embodiment of a communication system that provide media services by way of a residential gateway described in FIGS. 1-2.

FIG. 4 depicts an illustrative embodiment of a first communication system 400 for delivering media content. The communication system 400 can represent an Internet Protocol Television (IPTV) media system. Communication system 400 can be overlaid or operably coupled with the systems 100, 200 of FIGS. 1 and/or 2 as another representative embodiment of communication system 400. For instance, one or more devices illustrated in the communication system 400 of FIG. 4. Network traffic of a traffic flow is detected at a traffic controller of a first portion of a software-defined network. The detected network traffic is based on a service of a number of services and a source of the detected network traffic is identified based on the detected traffic. The traffic flow is between a subscriber device and a service platform. The service is identified based on the detected network traffic, and a service requirement is determined based on the identifying of the service. A virtual network function of a number of virtual network functions is selected based on the source of the network traffic and the service requirement, and a traffic flow is facilitated between the subscriber device and the service platform by way of the virtual network function.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an SDN controller (herein referred to as SDN controller 430). The SDN controller 430 can use computing and communication technology to perform function 462, which can include among other things, the traffic flow techniques described by the process 300 of FIG. 3. For instance, function 462 of server 430 can be similar to the functions described for one or more of the distributed service manager 214, the traffic management gateway 226, the local SDN controller 222 and the SDN controller 212 of FIG. 2, e.g., in accordance with the process 300 of FIG. 3. The residential gateway 404 can be provisioned with software functions 464, to utilize the services of SDN controller 430. For instance, functions 464 of the residential gateway 404 can be similar to the functions described for the residential gateway 104 of FIG. 1, and/or the homebased service handler 204 of FIG. 2 in accordance with the process 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
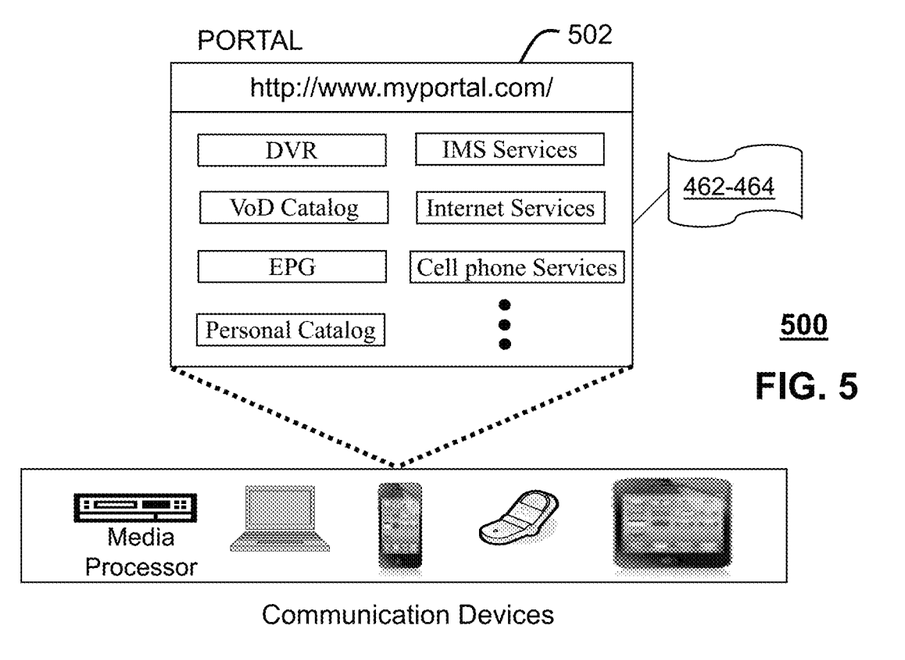
FIG. 5 depicts an illustrative embodiment of a web portal for interacting with the communication systems of FIGS. 1-2 and/or 4.

FIG. 5 depicts an illustrative embodiment of a web portal 502 of a communication system 500. Communication system 500 can be overlaid or operably coupled with systems 100, 200 of FIGS. 1 and/or 2, and/or communication system 400 of FIG. 4, as another representative embodiment of systems 100, 200 of FIGS. 1 and/or 2, and/or communication system 400 of FIG. 4. The web portal 502 can be used for managing services of systems 100, 200 of FIGS. 1 and/or 2 and communication systems 400-500. A web page of the web portal 502 can be accessed by a Uniform Resource Locator (URL) with an Internet browser using an Internet-capable communication device such as those described in FIGS. 1, 2 and/or 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462-464 to adapt these applications as may be desired by subscribers and/or service providers of systems 100, 200, 400 of FIGS. 1, 2 and/or 4, and communication system 400. For instance, users of the services provided by the residential gateway 104, the home-based service handler 204, the SDN controller 112, 212, 222, 430, the traffic management gateway 226, the distributed service manager 214 and/or the subscriber service policy controller repository 223 can log into their on-line accounts and provision the servers 110 or server 430 with user profiles, service requirements, subscription information, preferences, policy and/or rules as might apply to one or more of virtual network functions, virtual machines, software defined network flow, service subscriptions and the like, and to provide contact information to server to enable it to communication with devices described in FIGS. 1-4, and so on. Service providers can log onto an administrator account to provision, monitor and/or maintain the systems 100, 200 of FIGS. 1 and/or 2 and/or the SDN controller 430.

Figure 6:
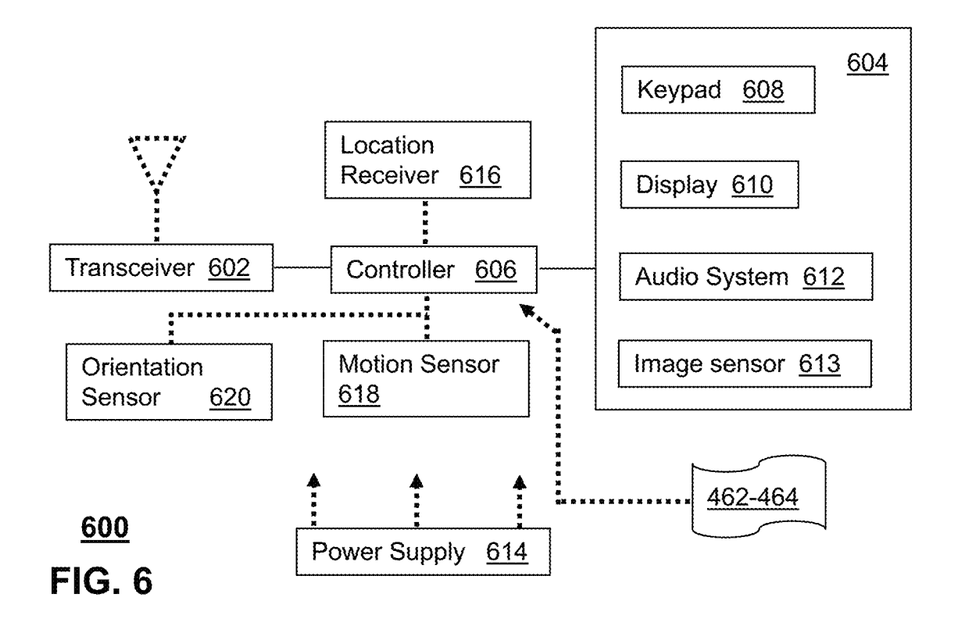
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1, 2 and/or 4 and can be configured to perform portions of process 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the devices of FIGS. 1 and/or 2, the media processor 406, the media devices 408, or the portable communication devices 416 of FIG. 4. It will be appreciated that the communication device 600 can also represent other devices that can operate in the systems of FIGS. 1 and/or 2, the communication system 400 of FIG. 4, such as a gaming console and a media player. In addition, the controller 606 can be adapted in various embodiments to perform the functions 462-464, respectively.

Upon reviewing the aforementioned embodiments, it would be evident to an artisan with ordinary skill in the art that said embodiments can be modified, reduced, or enhanced without departing from the scope of the claims described below. For example, the local resources 217 can be shared among more than on residence. For example, local resources of a high occupancy residence, such as an apartment or condominium complex, can be configured to serve more than one residence of the high occupancy residence. In other embodiments, the local resources 217 can be shared according to a particular neighborhood or geographic region. Alternatively or in addition, the local resources 217 can be provided in whole or in part in a access network provided between the residential Lan 210 and the carrier, service provider WAN 206. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
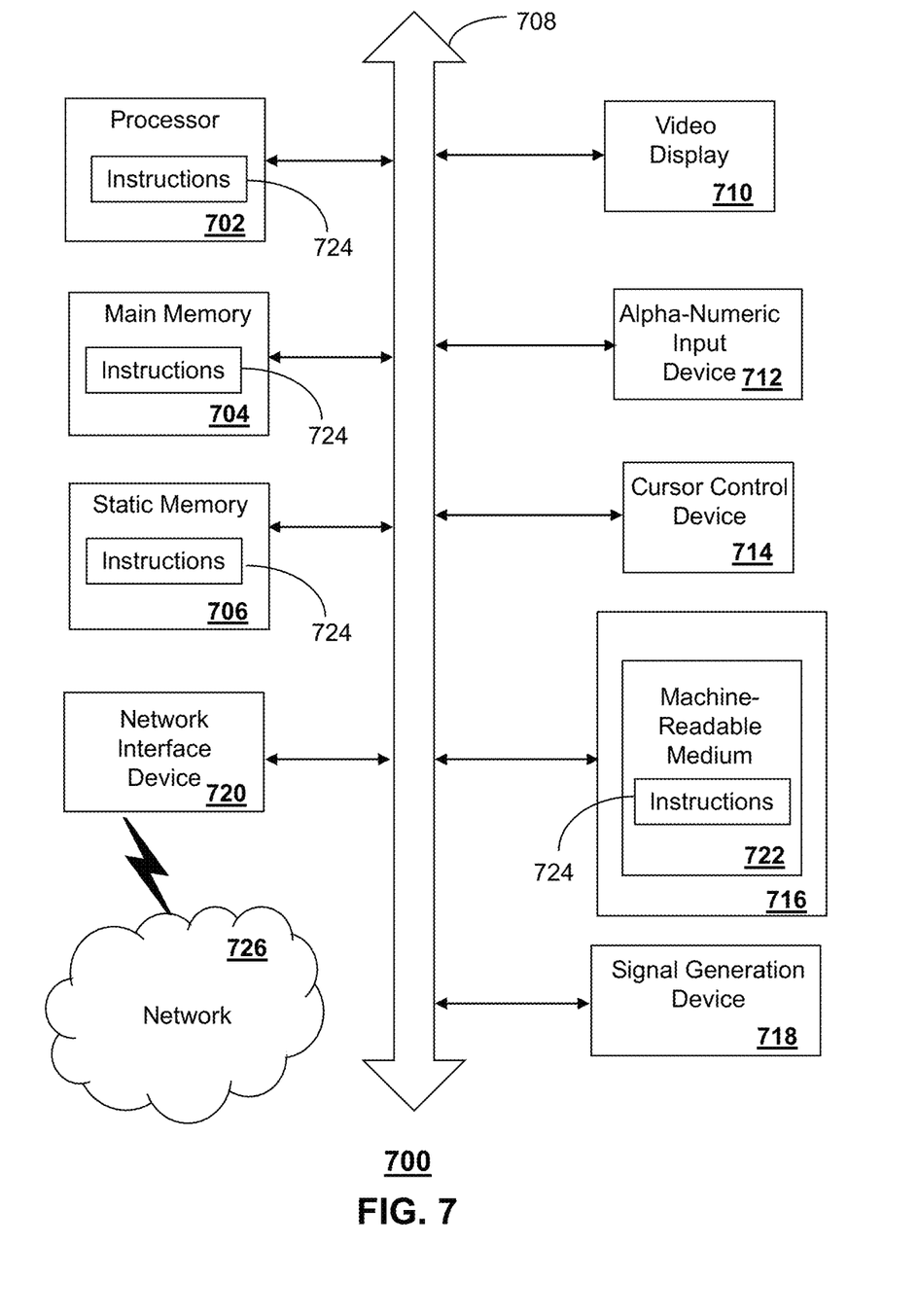
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the SDN controller 430, the media processor 406, the residential gateway 102, the homebased service handler 204, the SDN controller 112, 212, 222 the virtual machines 114, 224, e.g., as a host machine upon which the virtual machines are defined, the traffic management gateway 226, the distributed service manager 214, the subscriber service policy controller repository, any of the end-user devices 108, 208 and other devices of FIGS. 1-2 and 4-6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device

720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a processing system including a processor; and
    a memory that stores executable instructions that, when executed by the processing system, facilitate performance of operations, comprising:
        intercepting a network traffic flow at a traffic flow controller of a software-defined network, wherein the network traffic flow is between a user device and a service platform of a plurality of service platforms;
        identifying a service of a plurality of services from the network traffic flow;
        determining a service requirement based on the identifying of the service of the plurality of services;
        selecting a virtual network function of a plurality of virtual network functions based on the service requirement; and
        configuring the network traffic flow between the user device and the service platform by way of the virtual network function of the plurality of virtual network functions.

2. The device of claim 1, wherein the intercepting comprises intercepting a request for the service.

3. The device of claim 1, wherein the network traffic flow comprises an interactive communication session between the user device and a service provider.

4. The device of claim 1, wherein the selecting comprises determining whether the virtual network function satisfies the service requirement.

5. The device of claim 1, wherein the service requirement comprises one of latency, delay, priority, service type, security, or any combination thereof.

6. The device of claim 1, wherein the traffic flow controller communicates with each of the plurality of service platforms according to a flow-control protocol of the software-defined network.

7. The device of claim 1, wherein the network traffic flow is configured to provide an update, defined by a service provider, to a function of the user device.

8. The device of claim 1, wherein the traffic flow controller comprises a first traffic flow controller of a first portion of the software-defined network, and wherein the first traffic flow controller is in communication with a second traffic flow controller of a second portion of the software-defined network.

9. The device of claim 8, wherein the first portion is provided at a premises and comprises a traffic management gateway, and wherein the second portion is provided remote from the premises and comprises a distributed service manager.

10. The device of claim 9, wherein the distributed service manager is in a communication path between the traffic management gateway and the second traffic flow controller.

11. A method, comprising:
    intercepting, by a processing system including a processor, a network traffic flow at a traffic flow controller of a software-defined network, wherein the network traffic flow is between a user device and a service platform of a plurality of service platforms;
    identifying, by the processing system, a service of a plurality of services from the network traffic flow;
    determining, by the processing system, a service requirement based on the identifying of the service of the plurality of services;
    selecting, by the processing system, a virtual network function of a plurality of virtual network functions based on the service requirement; and
    configuring, by the processing system, the network traffic flow by way of the virtual network function of the plurality of virtual network functions.

12. The method of claim 11, wherein the network traffic flow is configured to provide an update, defined by a service provider, to a function of the user device.

13. The method of claim 12, wherein the traffic flow controller communicates with each of the plurality of service platforms according to a flow-control protocol of the software-defined network.

14. The method of claim 11, wherein the intercepting comprises intercepting a request for the service.

15. The method of claim 11, wherein the selecting comprises determining whether the virtual network function satisfies the service requirement.

16. The method of claim 11, wherein the traffic flow controller comprises a first traffic flow controller of a first portion of the software-defined network provided at a premises, and wherein the first traffic flow controller is in communication with a second traffic flow controller of a second portion of the software-defined network provided remote from the premises.

17. A non-transitory machine-readable medium, comprising executable instructions that, when executed by a processing system including a processor, facilitate performance of operations, comprising:
   intercepting a network traffic flow in a software-defined network between a user device and a service platform of a plurality of service platforms;
   identifying a service of a plurality of services from the network traffic flow;
   determining a service requirement based on the identifying of the service of the plurality of services;
   selecting a virtual network function of a plurality of virtual network functions based on the service requirement; and
   configuring the network traffic flow by way of the virtual network function of the plurality of virtual network functions.

18. The non-transitory machine-readable medium of claim 17, wherein the network traffic flow is intercepted at a traffic flow controller of the software-defined network.

19. The non-transitory machine-readable medium of claim 18, wherein the traffic flow controller communicates with each of the plurality of service platforms according to a flow-control protocol of the software-defined network.

20. The non-transitory machine-readable medium of claim 17, wherein the selecting comprises determining whether the virtual network function satisfies the service requirement.

* * * * *